(12) United States Patent
Kraft et al.

(10) Patent No.: US 8,311,511 B2
(45) Date of Patent: Nov. 13, 2012

(54) DATA PRIVACY ON WIRELESS COMMUNICATION TERMINAL

(75) Inventors: Christian Kraft, Frederiksberg C (DK); Peter Dam Nielsen, Lyngy (DK); Niklas Olesen, Dragor (DK)

(73) Assignee: Nokia Corporation, Espoo (FI)

( * ) Notice: Subject to any disclaimer, the term of this patent is extended or adjusted under 35 U.S.C. 154(b) by 1462 days.

(21) Appl. No.: 11/466,993

(22) Filed: Aug. 24, 2006

(65) Prior Publication Data

US 2008/0051072 A1 Feb. 28, 2008

(51) Int. Cl.
*H04M 1/66* (2006.01)

(52) U.S. Cl. .................. 455/410; 455/411; 455/412.1; 455/414.3; 455/550.1; 379/161; 379/142.05; 379/142.06

(58) Field of Classification Search ............... 455/412.1, 455/564, 410, 411, 418, 414.2, 550.1; 379/161, 379/142.06, 142.05
See application file for complete search history.

(56) References Cited

U.S. PATENT DOCUMENTS

| 4,682,148 | A | * | 7/1987 | Ichikawa et al. | 340/7.52 |
| 6,032,053 | A | | 2/2000 | Schroeder et al. | |
| 6,760,432 | B1 | * | 7/2004 | Wong et al. | 379/356.01 |
| 2003/0174833 | A1 | | 9/2003 | Wang | |
| 2005/0085217 | A1 | * | 4/2005 | Lim | 455/410 |
| 2006/0101337 | A1 | * | 5/2006 | Sakata | 715/705 |
| 2006/0294374 | A1 | * | 12/2006 | Tsampalis et al. | 713/166 |

FOREIGN PATENT DOCUMENTS

| EP | 1 655 650 A1 | 5/2006 |
| WO | WO 01/54385 A2 | 7/2001 |

OTHER PUBLICATIONS

International Search Report and Written Opinion for International Application No. PCT/EP2007/007323 dated Nov. 27, 2007.

* cited by examiner

*Primary Examiner* — Kathy Wang-Hurst

(74) *Attorney, Agent, or Firm* — Alston & Bird LLP

(57) ABSTRACT

A wireless communication terminal in which items are stored that have been generated or received during use of the terminal is provided with a system for restricting access to private or sensitive information by unauthorized users in a user-friendly way that does not require entry of a password.

25 Claims, 5 Drawing Sheets

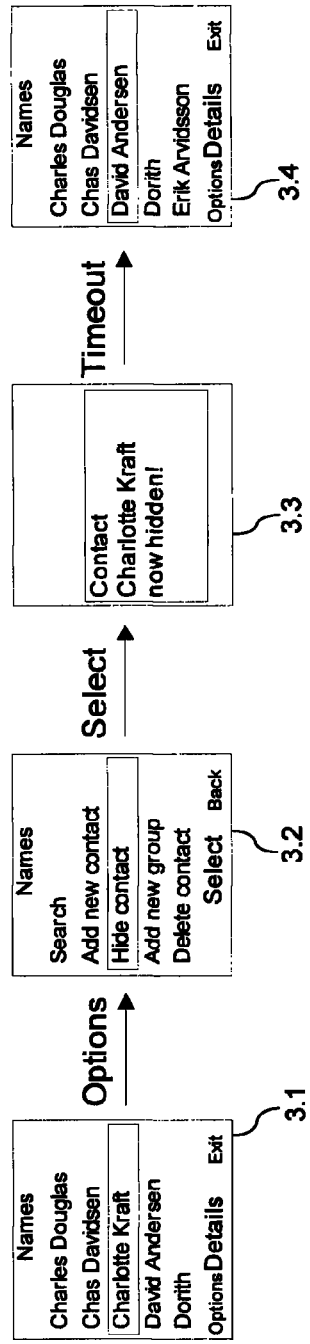
FIG. 3
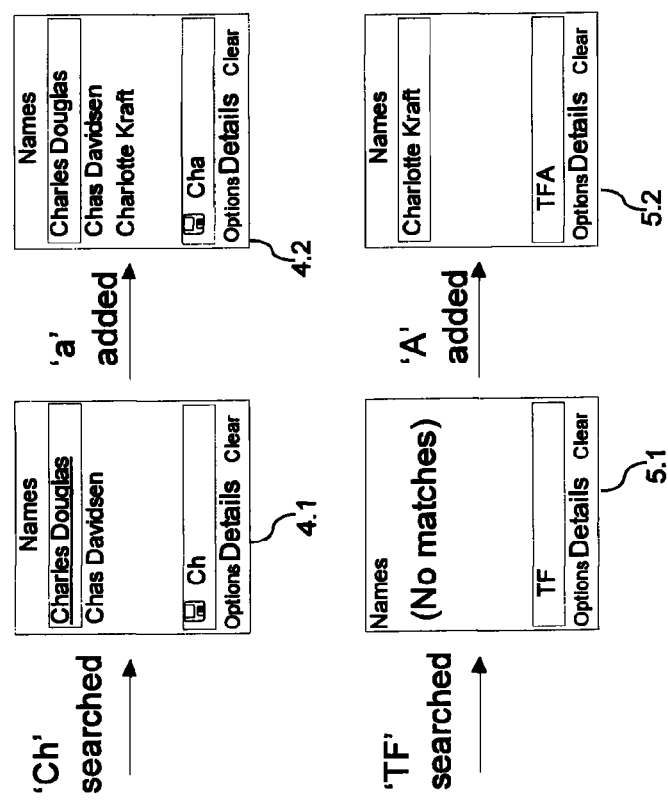
FIG. 4
FIG. 5

DATA PRIVACY ON WIRELESS COMMUNICATION TERMINAL

FIELD

The disclosed embodiments relate to a wireless communication terminal device in which private or sensitive information is stored.

BACKGROUND

The items that are stored in mobile phones during their use, such as entries in the phonebook, sent and received messages, call records, photos, sound recordings, documents etc., are becoming more and more personal and some of the information in these items can be considered as private or sensitive by the user of the mobile phone. Teenagers may have "secret" friends and business people may have "secret" contacts, etc.

Thus, users may not wish that all the information in their mobile phones is easily accessible to others (unauthorized users). The same problem also exists for personal computers, but in contrast to personal computers it is not uncommon to borrow out one's mobile phone to allow somebody to make a call while it is unlikely that users borrow their personal computers for somebody to send an e-mail. While the mobile phone is borrowed, the borrowing person can access some of the sensitive or private information in a matter of seconds in conventional mobile phones.

Protection of sensitive or private information is known in the form of password protected data. However, it is well-known that end-users are not fond of using passwords and therefore protecting for example certain contacts (the entries) in the phonebook of a mobile phone via passwords is not a viable option.

SUMMARY

On this background, in one embodiment a wireless terminal is provided, of the kind in which access to private or sensitive information can be restricted in a manner that does not hamper a user having has the right to access the information.

In one aspect, this is achieved by providing a wireless terminal comprising a memory having stored therein a plurality of items in the form of data generated or received during use of the terminal, the items having a privacy attribute associated therewith that is also stored in the memory, the privacy attribute restricting or enabling access to the item concerned, a processor unit coupled to the memory, and operable to disclose any of the stored items having an enabling privacy attribute associated therewith, the processor unit is operable to search stored items on the basis of a search criterion entered by a user, and the processor unit is operable to disclose items that have a restricting privacy attribute only after a user has entered a search criterion that at least partially matches information in the item concerned or at least partially matches an attribute associated with the item concerned.

By allowing the wireless terminal to disclose the items that have been marked as restricted via a simple search, the user that has the right to access information can gain access in an easy and intuitive manner. A user who for example wishes to retrieve a restricted contact in the phonebook only needs to enter the first characters of the first or last name of the person associated with the phonebook entry in order to access the phonebook entry concerned. Since the authorized user will normally know which contacts are stored in the phonebook, it is easy for the authorized user to remember the search criterion that will enable access to the phonebook entry concerned. The minimum number of characters that have to match information in the item to which access is to be gained can be set individually by the users to determine the level of security to gain access to the sensitive or private information. Thus, an empty search criterion or a search criterion that does not include a predetermined minimum number of characters will not yield any item's that have been marked as private or sensitive. Thus, protection of private or sensitive information stored in the mobile telephone is achieved in a user-friendly manner that avoids the use of passwords.

Further, the normal way of retrieving a contact in the phonebook of a conventional mobile phone is by entering the first letters (or characters) of the first or last name of the contact that is to be retrieved (this may not be true for users that only have very few contacts stored in their phonebook, since for these users it is easier to simply scroll through the very short index). Thus, in many cases (users that have many entries in their phonebook) there is no real perceived change for the user, except that at least the minimum amount of characters have to be included in the search before the restricted contacts can be seen.

The wireless terminal may further comprise a user interface including a display and a keypad.

Preferably, the processor is operable to show a list of matching items on the display after a user has entered a search criterion. The search criterion may have a minimum number of characters in order to enable access to items that have a restrictive privacy attribute.

The list of matching items may include both items with a restricting privacy attribute and items with an enabling privacy attribute.

Preferably, the wireless terminal comprises a phonebook function, wherein the items are phonebook entries or sent or received messages associated with the phonebook entries.

The processor unit may be configured to disclose phonebook entry or messages associated with phonebook entries that have a restricting privacy attribute associated therewith only after a search criterion has been entered by the user that includes a predetermined number of characters matching a name in the phonebook entry concerned. Thus, the user only needs to be able to remember the first or last name of the contact that he/she is trying to retrieve.

The processor unit may further be configured to disclose phonebook entries or messages associated with a phonebook entries that have a restricting privacy attribute associated therewith only after a search criterion has been entered by the user that matches an access attribute associated with the phonebook entry concerned. Thus, it is possible for the user to create special "secret" access codes for items that should have an increased level of access security. The access attribute can be a user defined code.

Preferably, the processor unit is configured to alert the user of the receipt of a message from a contact of a phonebook entry that has a restricting privacy attribute by means of a discrete notification. The discrete notification can be a tone reproduced by a loudspeaker in the terminal and/or an icon shown on the display.

The terminal can further comprise a message handling application with one or more folders in which sent, drafted or received messages are listed, wherein the message handling application is configured not to list messages sent to, drafted for or received from contacts of a phonebook entry that has a restricting privacy attribute in any of the folders. The message handling application can be configured to show messages sent to, drafted for or received from contacts of a phonebook that have a restricting privacy attribute only after the user has entered a search criterion that at least partially matches a name of the phonebook entry concerned or on attribute associated with the phonebook entry concerned.

The terminal may also comprise a call handling application that is operable to store call events, wherein the call handling application is configured not to show any call events that relate to phonebook entries that have a restricting privacy attribute.

In another aspect, the above can also be achieved by providing a method for detecting private and/or sensitive information in the form of items that are stored in a memory of a wireless terminal as data generated during use of the terminal, comprising associating a privacy attribute with the items, the privacy attribute restricting or enabling access to the item concerned, disclosing any of the items that have an enabling privacy attribute, and disclosing any of the items that have a restricting privacy attribute only after a user has entered a search criterion that at least partially matches information in the item concerned or at least partially matches an attribute associated with the item concerned.

Preferably, the method further comprises showing a list of matching items on the display after a user has entered a search criterion. The list of matching items may include both items with a restricting privacy attribute and items with an enabling privacy attribute.

The terminal may further comprise a phonebook function, in which case the items are phonebook entries or sent or received messages associated with the phonebook entries.

Preferably, the method further comprises disclosing phonebook entries or messages associated with a phonebook entry that has a restricting privacy attribute associated therewith only after a search criterion has been entered by the user that includes a predetermined number of characters matching a name in the phonebook entry concerned.

The method may also comprise disclosing phonebook entries or messages associated with a phonebook entry that has a restricting privacy attribute associated therewith only after a search criterion has been entered by the user that matches an access attribute associated with the phonebook entry concerned. The access attribute can be a user defined code.

The method may further comprise alerting the user of the receipt of a message from a contact of a phonebook entry that has a restricting privacy attribute by means of a discrete notification. The discrete notification can be a tone reproduced by a loudspeaker in the terminal and/or an icon shown on the display.

The terminal may further comprise a message handling application with one or more folders in which sent, drafted or received messages are listed, in which case the method may further comprise not listing messages sent to, drafted for or received from contacts of a phonebook entry that have a restricting privacy attribute in any of the folders.

Preferably, the method further comprises showing messages sent to, drafted for or received from contacts of a phonebook that have a restricting privacy attribute only after the user has entered a search criterion that at least partially matches a name of the phonebook entry concerned or an attribute associated with the phonebook entry concerned.

In one embodiment a software product is provided that comprises software code for associating a privacy attribute to items that are stored in a wireless terminal as data that is generated or received during use of the terminal, software code for disclosing any of the stored items having an enabling privacy attribute associated therewith, software code for searching stored items on the basis of a search criterion entered by a user, and software code for disclosing items that have a restricting privacy attribute only after a user has entered a search criterion that at least partially matches information in the item concerned or at least partially matches an attribute associated with the item concerned.

Further objects, features, advantages and properties of the wireless terminal, method and software product according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which.

DETAILED DESCRIPTION OF PREFERRED EMBODIMENTS

In the following detailed description, the device and the method according to the invention in the form of a PDA, mobile terminal or a mobile communication terminal in the form of a cellular/mobile phone will be described by the preferred embodiments.

Figure 1:
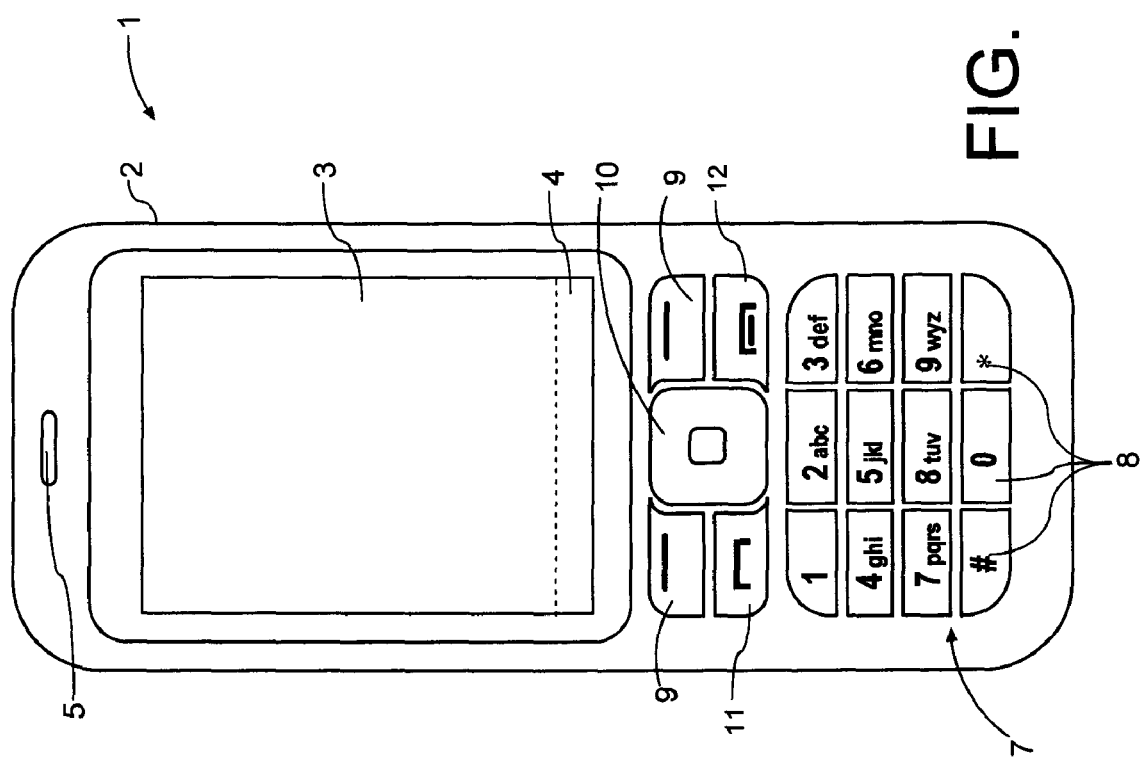
FIG. 1 is a front view of a wireless terminal according to a preferred embodiment of the invention.

FIG. 1 illustrates a first embodiment of a mobile terminal according to the invention in the form of a mobile telephone by a front view. The mobile phone 1 comprises a user interface having a housing 2, a display 3, an on/off button (not shown), a speaker 5 (only the opening is shown), and a microphone 6 (not visible in FIG. 1). The phone 1 according to the first preferred embodiment is adapted for communication via a cellular network, such as the GSM 900/1800 MHz network, but could just as well be adapted for use with a Code Division Multiple Access (CDMA) network, a 3G network, or a TCP/IP-based network to cover a possible VoIP-network (e.g. via WLAN, WIMAX or similar) or a mix of VoIP and Cellular such as UMA (Universal Mobile Access).

The keypad 7 has a first group of keys 8 as alphanumeric keys, by means of which the user can enter a telephone number, write a text message (SMS), write a name (associated with the phone number), etc. Each of the twelve alphanumeric keys 8 is provided with a figure "0-9" or a sign "#" or "*", respectively. In alpha mode each key is associated with a number of letters and special signs used in the text editing.

The keypad 2 has additionally a second group of keys comprising two softkeys 9, two call handling keys (offhook key 11 and onhook key 12), and a 5-way navigation key 10 (up, down, left, right and center: select/activate). The function of the softkeys 9 depends on the state of the phone, and navigation in the menu is performed by using the navigation-key 10. The present function of the softkeys 9 is shown in separate fields (soft labels) in a dedicated area 4 of the display 3, just above the softkeys 9. The two call handling keys 11,12 are used for establishing a call or a conference call, terminating a call or rejecting an incoming call. This key layout is characteristic for e.g. the Nokia 6230i™ phone.

The navigation key 10 is a four- or five-way key which can be used for cursor movement, scrolling and selecting (five-way key) and is placed centrally on the front surface of the phone between the display 3 and the group of alphanumeric keys 7.

A releasable rear cover (not shown) gives access to the SIM card (not shown), and the battery pack (not shown) in the back of the phone that supplies electrical power for the electronic components of the mobile phone 1.

The mobile phone 1 has a flat display 3 that is typically made of an LCD with optional back lighting, such as a TFT matrix capable of displaying color images. A touch screen may be used instead of a conventional LCD display.

Figure 2:
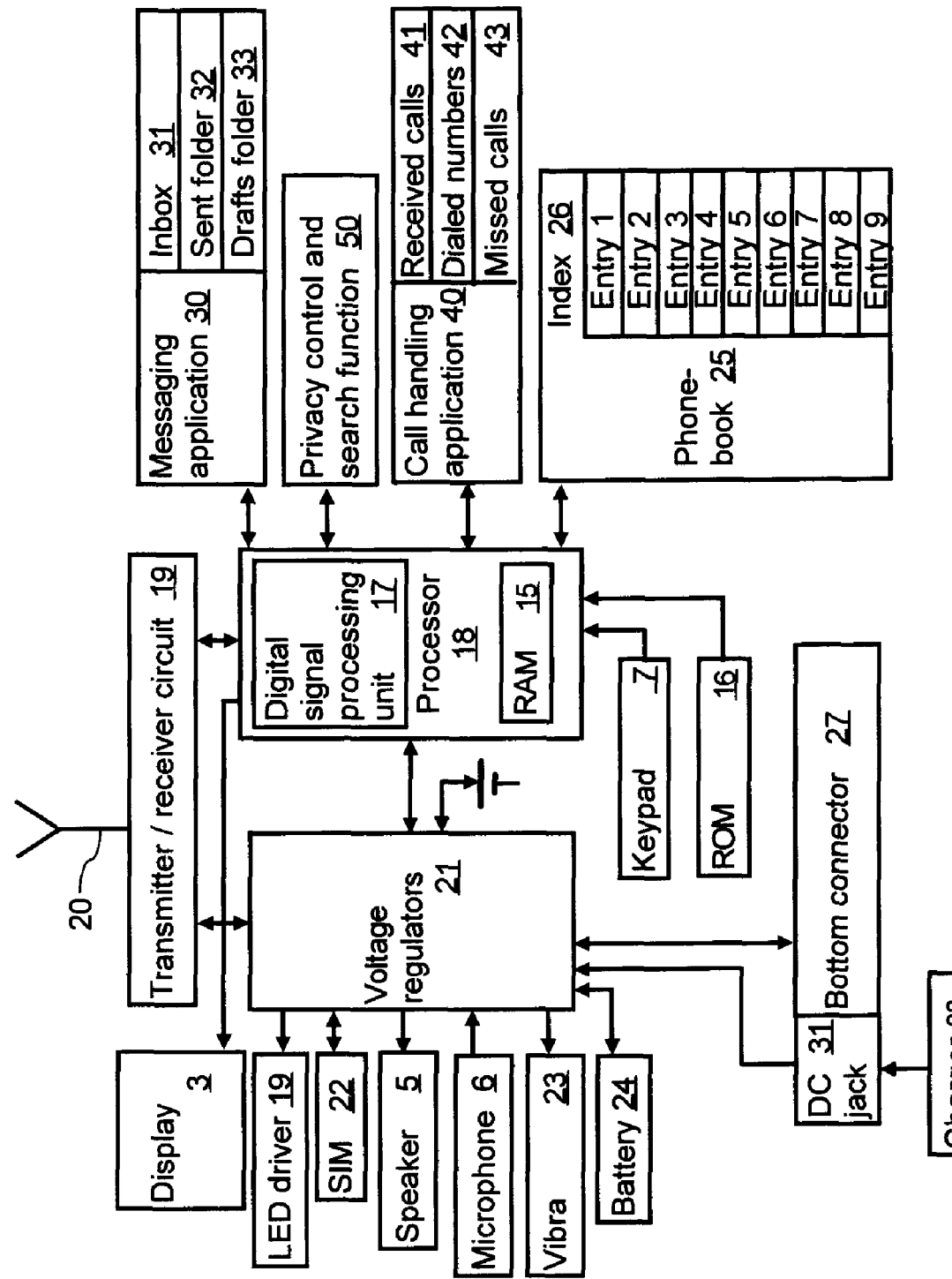
FIG. 2 is a block diagram illustrating the general architecture of the mobile wireless terminal illustrated in FIG. 1, FIGS. 3 to 8 show screenshots of the display of the wireless terminal illustrated in FIG. 1.

FIG. 2 illustrates in block diagram form the general architecture of the mobile phone 1 constructed in accordance with the present invention. The processor 18 controls the operation of the terminal and has an integrated digital signal processor 17 and an integrated RAM 15. The processor 18 controls the communication with the cellular network via the transmitter/receiver circuit 19 and an internal antenna 20. A microphone 6 coupled to the processor 18 via voltage regulators 21 transforms the user's speech into analogue signals, the analogue signals formed thereby are A/D converted in an A/D converter (not shown) before the speech is encoded in the DSP 17 that is included in the processor 18. The encoded speech signal is transferred to the processor 18, which e.g. supports the GSM terminal software. The digital signal-processing unit 17 speech-decodes the signal, which is transferred from the processor 18 to the speaker 5 via a D/A converter (not shown).

The voltage regulators 21 form the interface for the speaker 5, the microphone 6, the LED drivers 19 (for the LEDS backlighting the keypad 7 and the display 3), the SIM card 22, the vibration unit 23, battery 24, the bottom connector 27 and the DC jack 31 (for connecting to the charger 33).

The processor 18 also forms the interface for some of the peripheral units of the device, including a (Flash) ROM memory 16, the graphical display 3, and the keypad 7.

The memory 16 includes a plurality of stored constants and variables that are used by processor 18 during the operation of the mobile terminal 1.

For example, memory 16 stores the values of the various feature parameters, an electronic phonebook 25, a messaging application 30, a call handling application 40 and a privacy control and search function 50.

Typically, the phone book data, the call data and the messaging data are stored in the ROM 16 so that the data are not lost when the terminal 1 is switched off. An operating program for controlling the operation of processor 18 is also stored in memory 16 (typically in the read only memory). Memory 16 is also used to store data provided by the user through the user interface. Furthermore, memory 16 is used to hold the sub-programs or sub-processes for controlling the operation of mobile terminal 1 and carrying out the embodiment of the invention.

The entries in the phonebook (phonebook data entries, also referred to as "contacts" in this document) and attributes associated with these entries are stored in memory 16. Although only nine entries are shown in the exemplary embodiment in FIG. 2, it is understood that the number of entries in the phonebook could be smaller or larger.

The preferred embodiment of the invention operates with a privacy attribute associated with the phonebook entries. The privacy attribute either enables or restricts access to the phonebook entry to which it belongs. The phonebook index 26 lists all the entries (typically in alphabetical order) that have an enabling privacy attribute, whilst phonebook entries that have a restricting privacy attribute are not listed in the phonebook index 26.

The phonebook entries may include regular contact data, such as first name, last name, street address, phone number, e-mail address, etc. The privacy attribute is set by the user and serves to restrict access to private or sensitive information for unauthorized users.

A messaging application 30 enables the sending and receiving of messages, such as SMS messages, MMS messages and e-mail messages, and includes an inbox 31 in which received messages are stored, a sent folder 32 in which sent messages are stored and a drafts folder in which draft messages are stored. Through the phone menu the user can access these various folders and the messages stored therein. Further, the messages can be replied to, forwarded, deleted or moved. Each of these folders shows a list of the messages stored therein, but not the messages that are related to a phonebook entry that has a restricting privacy attribute.

A call handling application 40 enables initiating, answering and rejecting calls. The call handling application includes a call register with a folder for received calls 41 in which received calls are stored, a folder for dialed numbers 42 in which dialed numbers are stored and a folder for missed calls 43 in which missed calls are stored. The stored calls can be accessed by the user via the folders and can be used to place a call to the stored number. Stored calls that are related to a phonebook entry that has a restrictive privacy attribute are not listed or shown in the folders of the call handling application 40.

The operating program in memory 16 includes routines in the form of a privacy control and search function 50 that enables the user to search and sort phonebook entries that are stored in the phonebook 25, to search and sort calls stored in the call handling application 40 and to search and sort messages stored in the messaging application 30. The privacy control and search function 50 can be activated from within the respective parts of the menu, i.e. the privacy control and search function 50 can be activated from the messaging application, from the call handling application 30 and from the phonebook 25.

The search is performed in accordance with a search criterion related to data in the phonebook entries, an attribute associated with the phonebook entries, data in the messages or attributes related thereto, and in data relating to the calls.

The term "item" as used herein covers any set of data that is generated, received or downloaded during use of the terminal. Items can be phonebook entries, messages, calls, pictures, videos, sound recordings, songs, documents, etc. Items that have an enabling privacy attribute will be shown in the search result even if the search criterion contains less characters than required for showing items with a restricting attribute, for example when the user has entered the search criterion "a". Items that have a restricting privacy attribute will only be listed in the search result when a minimum number of characters match data in the item. For example, a phonebook entry may only be shown when the user has at least entered the three first characters of the first or last name as the search criterion. Once the item with the restricting privacy attribute is listed, the user can use the item in the same way as any other items. For example a message received from a contact with a restricting privacy attribute can be opened, replied to, moved or deleted when it is shown in the list with the search results.

FIG. 3 illustrates the procedure for setting the privacy attribute of a phonebook entry to restrictive. In screenshot 3.1 a phonebook entry "Charlotte Kraft" in the index 26 is highlighted and the left softkey 9 "Options" is pressed to arrive at screenshot 3.2 In screenshot 3.2 a number of phonebook entry related functions are listed, the highlighted function being "Hide contact". When the navigation 10 "Select" is pressed the terminal responds by showing a confirmation on the display "Contact Charlotte Kraft now hidden!" (screenshot 3.3) indicating that the phonebook entry has been provided with a restricting privacy attribute. After a timeout the display turns to screenshot 3.4 listing the phonebook index 26. The phonebook entry "Charlotte Kraft" is no longer listed in the index, and can only be retrieved by performing a search with a search criterion that has at least a predetermined number of matching characters. The minimal number of matching characters can be set by the user and could be two, three or more characters, depending on the level of access security that is desired. In this respect it is noted that the present invention does not intend to provide a completely secure system that cannot be broken into. The present invention merely aims to make it impossible or very difficult for unauthorized users to borrow a mobile phone for a short while to access restricted information.

FIG. 4 illustrates the search function 50 by means of two screenshots 4.1 and 4.2. In screenshot 4.1 the user has entered a search criterion with the letters "Ch" and the phonebook entries "Charles Douglas" and "Chas Davidson" that have enabling privacy attributes are listed. The phonebook entry "Charlotte Kraft" is not listed even though the entered search criterion matches the first two letters of the first name of the phonebook entry since the user sets the security level requires a search criterion with at least three matching characters. It is understood that these characters should be the first three letters of the first or last name of the phonebook entry concerned.

However, the criterion of the first three letters of the name to match is only by way of example, and as for example shown in FIG. 5 the user could set the terminal to require that at least three characters in reverse order are entered as a search criterion in order to disclose the phonebook entry (or other item) concerned. In screenshot 5.1 the user has entered only the two characters in the reverse order of the last name of the phonebook entry that is to be retrieved. Since at least three matching characters in the reverse order (spelled backwards) are required, the matching phonebook entry is not shown and the display indicates "(No matches)". The user adds a letter "a" to the search criterion and arrives at screenshot 5.2 that lists the matching phonebook entry "Charlotte Kraft" since the minimum number of characters in reverse order of the last name has been entered as search criterion.

To make the disclosure of hidden contacts even more difficult it is also possible for the user to store a contact under a "secret" nickname which cannot be easily guessed, searched or identified by an unauthorized user.

Figure 6:
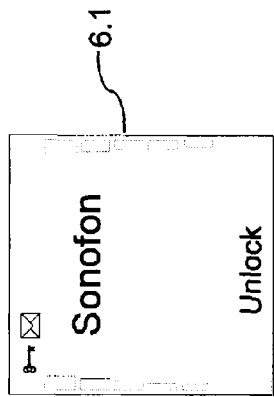

When a message is received from a contact (phonebook entry) that has a restricting privacy attribute there will not be any pop up on the display with information that could reveal the receipt of a message and the sender easily to bystanders. Instead, a more discreet indication of the receipt of such messages is provided, a small beep, vibration and/or a message icon being "lit", as shown in FIG. 6 in screenshot 6.1.

Figure 7:
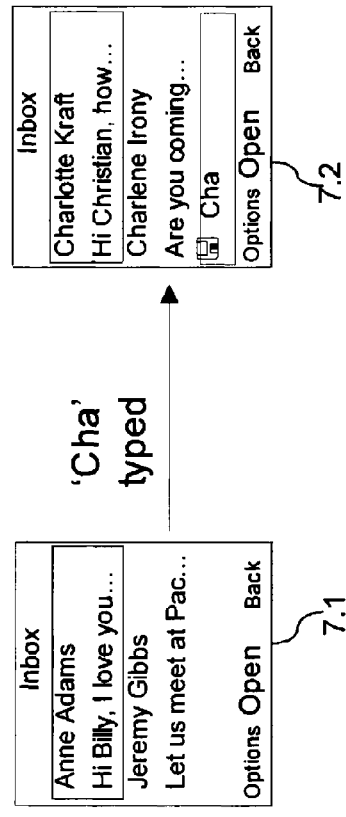

To view a message received from a contact with a restricting privacy attribute, the user needs to open the message inbox 31 as shown in screenshot 7.1 of FIG. 7. Messages received from contacts with a restricting privacy attribute can only be seen in the inbox by "searching" for the first name or the last name of the contact with the restricting privacy attribute. In screenshot 7.1 the user activates the search function via the left softkey 9 "Options" and enters the search criterion "Cha" with the alphanumerical keys 8. Thereupon, messages received from matching contacts are listed, including messages received from contacts with a restricting privacy attribute.

Messages in the sent folder 32 or in the drafts folder 33 that are related to a contact with a restricting privacy attribute can only be seen if a matching search criterion is entered via the search function 50.

Outgoing calls, received calls and missed calls that are related to contacts with a restricting privacy attribute are not listed in the received calls list 41, the dialed numbers list 42 and the missed calls list 43. These calls/dialed numbers can only be seen if a matching search criteria is entered by the search function 50.

Figure 8:
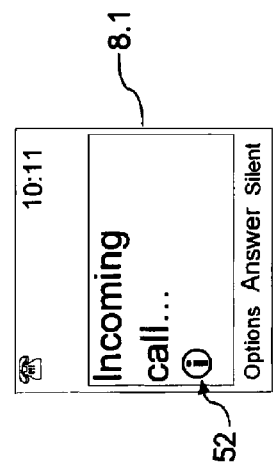

To avoid other persons seeing the name of hidden contacts during incoming calls, the incoming call will be displayed without the name or number. The incoming call can either be shown discreetly, as a call without calling line identification information, or the incoming call from a hidden contact can be displayed using a special icon 52 as shown in screenshot 8.1 in FIG. 8. The small discrete icon may help the user to know that it is a call that he/she may not want to answer in a current situation. This provides a way to distinguish the call from a "normal" call without calling line identification information.

Figure 9:
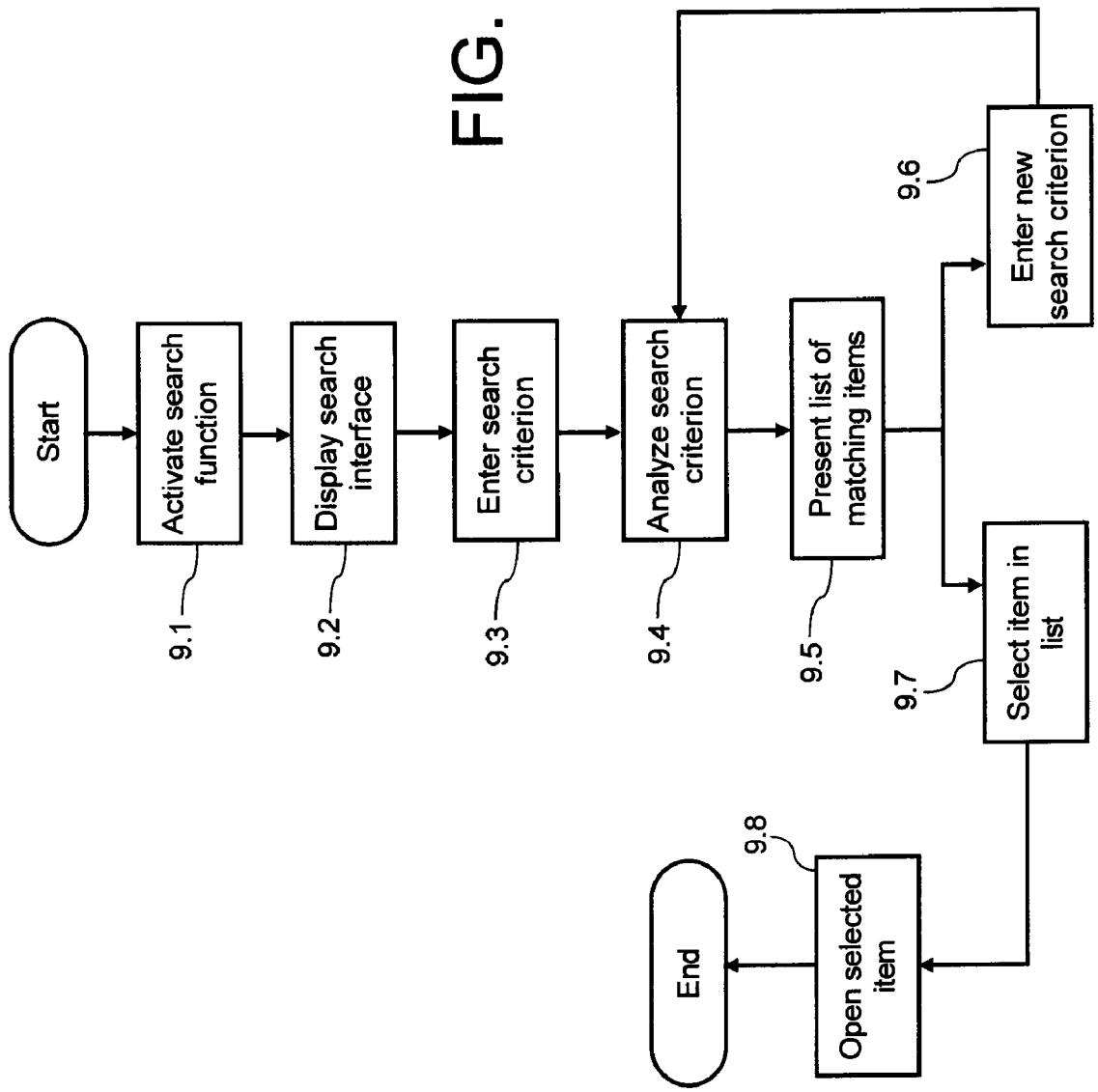
FIG. 9 is a flow chart illustrating the operation of a search function in the wireless terminal of FIG. 1.

The search procedure is illustrated in the flowchart of FIG. 9. In step 9.1 the search function 50 is activated. This can be done from the messaging application 30, from the calling application 40 and from the phonebook 25. If the phone is provided with other applications that deal with items that can be provided with privacy attributes, such as for example a photo viewer, a media player capable of playing videos or songs or sound recordings, then these items can also be searched via the search function and preferably, the search function can be started from within the respective applications, e.g. photos can be searched from within the photo viewing application. In step 9.2 the search interface is displayed. The search interface includes a window for entering the search criteria, as shown in screenshots 4.1, 4.2, 5.1, 5.2 and 7.2. In the next step 9.3 the user enters a search criterion. The search function is configured so that the processor performs a search (step 9.4) automatically each time a new character is added, i.e. user does not have to indicate that the search criterion entry is completed. After each time a new character is added to the search criterion a new list of matching items is presented (step 9.5), preferably as a list of matching items, such as for example shown in screenshots 4.2 and 7.2.

When the list of matching items has been presented the user can either enter a new search criterion (step 9.6) whereafter the process returns to step 9.4, or the user can select (highlight via scrolling through the list of matching items) an item in the list of matching items (step 9.7) and then open/activate the selected item (step 9.8).

The disclosure control can be used for any type of files or data stored in the phones and is not limited to the examples in the embodiment above. Examples of other types of files or information are pictures taken with a camera on the mobile phone, or that have been received or downloaded, sound recordings that have been made with the phone itself or that have been received or downloaded, video recordings that have been made by the phone itself or that have been received or downloaded, documents that have been created on the mobile phone, or that have been received or downloaded, etc.

The messages that can be used with the invention can be SMS messages, MMS messages, e-mail messages, PoC messages (Push to talk over Cellular), etc.

In one embodiment, a software program product, when run on a processor, executes the method comprising detecting private and/or sensitive information in the form of phonebook entries or sent or received messages or calls, pictures, videos, sound recording, songs or documents associated with the phonebook entries that are stored in a memory of a wireless terminal as data generated during use of the terminal, said memory also storing a phonebook comprising associating a privacy attribute with said items, said privacy attribute restricting or enabling access to the phonebook entry or sent or received message or calls, pictures, videos, sound recording, songs or documents associated with the phonebook entry concerned, disclosing any of said phonebook entries or sent or received messages or calls, pictures, videos, sound recording, songs or documents associated with the phonebook entries that have an enabling privacy attribute, and disclosing any of said phonebook entries or sent or received messages associated with the phonebook entries that have a restricting privacy attribute only after a user has entered a search criterion that at least partially matches information in the phonebook entry concerned or at least partially matches an attribute associated with the phonebook entry concerned.

The aspects of the disclosed embodiments also include a software product comprising software code for associating a privacy attribute to phonebook entries or sent or received messages or calls, pictures, videos, sound recording, songs or documents associated with the phonebook entries that are stored in a wireless terminal as data that is generated or received during use of the terminal, software code for disclosing any of the stored phonebook entries or sent or received messages or calls, pictures, videos, sound recording, songs or documents associated with the phonebook entries having an enabling privacy attribute associated therewith, software code for searching stored phonebook entries on the basis of a search criterion entered by a user, and software code for disclosing phonebook entries or sent or received messages or calls, pictures, videos, sound recording, songs or documents associated with the phonebook entries that have a restricting privacy attribute only after a user has entered a search criterion that at least partially matches information in the phonebook entry concerned or at least partially matches an attribute associated with the phonebook entry concerned.

The term "comprising" as used in the claims does not exclude other elements or steps. The term "a" or "an" as used in the claims does not exclude a plurality. The single processor unit may fulfill the functions of several means recited in the claims.

The reference signs used in the claims shall not be construed as limiting the scope.

Although the embodiments have been described in detail for purpose of illustration, it is understood that such detail is solely for that purpose, and variations can be made therein by those skilled in the art without departing from the scope of the invention.

The invention claimed is:

1. An apparatus comprising:
a processor and a memory including software code, the memory and the software code configured to, with the processor, cause the apparatus at least to:
disclose any items of a phonebook function that have an enabling privacy attribute associated therewith, a plurality of items of the phonebook function in the form of data generated or received during use of the apparatus, wherein said items are phonebook entries or sent or received messages or calls, pictures, videos, sound recording, songs or documents associated with the phonebook entries,
said phonebook entries having a privacy attribute associated therewith,
said privacy attribute restricting or enabling access to the item concerned,
search stored phonebook entries on the basis of a search criterion entered by a user, and
disclose items that have a restricting privacy attribute only after a user has entered a search criterion that at least partially matches information in the phonebook entry concerned or at least partially matches an attribute associated with the phonebook entry concerned, wherein the search criterion includes a predetermined number and order of characters of the phonebook entry concerned where the predetermined number and order of characters corresponds to a predefined security level.

2. The apparatus according to claim 1, further comprising a user interface including a display and a keypad.

3. The apparatus according to claim 2, wherein said processor is operable to show a list of matching phonebook entries or sent or received messages or calls, pictures, videos, sound recording, songs or documents associated with the phonebook entries on said display after a user has entered a search criterion.

4. The apparatus according to claim 3, wherein said list of matching items includes both phonebook entries or sent or received messages or calls, pictures, videos, sound recording, songs or documents associated with the phonebook entries with a restricting privacy attribute and phonebook entries or sent or received messages associated with the phonebook entries with an enabling privacy attribute.

5. The apparatus according to claim 1, wherein said processor is configured to disclose phonebook entries or messages or calls, pictures, videos, sound recording, songs or documents associated with phonebook entries that have a restricting privacy attribute associated therewith only after a search criterion has been entered by the user that includes a predetermined number of characters matching a name in the phonebook entry concerned.

6. The apparatus according to claim 1, wherein said processor is configured to disclose phonebook entries or messages or calls, pictures, videos, sound recording, songs or documents associated with a phonebook entry that has a restricting privacy attribute associated therewith only after a search criterion has been entered by the user that matches an access attribute associated with the phonebook entry concerned.

7. The apparatus according to claim 6, wherein the access attribute is a user defined code.

8. The apparatus according to claim 1, wherein said processor is configured to alert the user of the receipt of a message from a contact of a phonebook entry that has a restricting privacy attribute by means of a discreet notification.

9. The apparatus according to claim 8, wherein said discreet notification is a tone reproduced by a loudspeaker in the terminal and/or an icon shown on a display.

10. The apparatus according to claim 1, further comprising a message handling application with one or more folders in which sent, drafted or received messages are listed, wherein said message handling application is configured not to list messages sent to, drafted for or received from contacts of a phonebook entry that has a restricting privacy attribute in any of said folders.

11. The apparatus according to claim 10, wherein said message handling application is configured to show messages sent to, drafted for or received from contacts of a phonebook that have a restricting privacy attribute only after the user has entered a search criterion that at least partially matches a name of the phonebook entry concerned or an attribute associated with the phonebook entry concerned.

12. The apparatus according to claim 1, further comprising a call handling application that is operable to store call events, wherein said call handling application is configured not to show any call events that relate to phonebook entries that have a restricting privacy attribute.

13. A method for detecting private and/or sensitive information in the form of phonebook entries or sent or received messages or calls, pictures, videos, sound recording, songs or documents associated with the phonebook entries as data generated during use of a terminal, said method comprising:
   associating a privacy attribute with said phonebook entries or sent or received messages or calls, pictures, videos, sound recording, songs or documents associated with the phonebook entries, said privacy attribute restricting or enabling access to the phonebook entry or sent or received message or calls, pictures, videos, sound recording, songs or documents associated with the phonebook entry concerned,
   disclosing any of said phonebook entries or sent or received messages or calls, pictures, videos, sound recording, songs or documents associated with the phonebook entries that have an enabling privacy attribute, and
   disclosing any of said phonebook entries or sent or received messages associated with the phonebook entries that have a restricting privacy attribute only after a user has entered a search criterion that at least partially matches information in the phonebook entry concerned or at least partially matches an attribute associated with the phonebook entry concerned wherein the search criterion includes a predetermined number and order of characters of the phonebook entry concerned where the predetermined number and order of characters corresponds to a predefined security level.

14. The method according to claim 13, wherein the terminal further comprises a user interface including a display and a keypad.

15. The method according to claim 14, further comprising showing a list of matching phonebook entries or sent or received messages or calls, pictures, videos, sound recording, songs or documents associated with the phonebook entries on said display after a user has entered a search criterion.

16. The method according to claim 15, wherein said list of matching phonebook entries or sent or received messages associated with the phonebook entries includes both phonebook entries or sent or received messages associated with the phonebook entries with a restricting privacy attribute and phonebook entries or sent or received messages associated with the phonebook entries with an enabling privacy attribute.

17. The method according to claim 13, further comprising disclosing phonebook entries or messages associated with phonebook entries that have a restricting privacy attribute associated therewith only after a search criterion has been entered by the user that includes a predetermined number of characters matching a name in the phonebook entry concerned.

18. The method according to claim 13, further comprising disclosing phonebook entries or messages associated with phonebook entries that have a restricting privacy attribute associated therewith only after a search criterion has been entered by the user that matches an access attribute associated with the phonebook entry concerned.

19. The method according to claim 18, wherein the access attribute is a user defined code.

20. The method according to claim 13, further comprising alerting the user of the receipt of a message from a contact of a phonebook entry that has a restricting privacy attribute by means of a discreet notification.

21. The method according to claim 20, wherein said discreet notification is a tone reproduced by a loudspeaker in the terminal and/or an icon shown on a display.

22. The method according to claim 13, wherein the terminal further includes a message handling application with one or more folders in which sent, drafted or received messages are listed, comprising not listing messages sent to, drafted for or received from contacts of a phonebook entry that have a restricting privacy attribute in any of said folders.

23. The method according to claim 22, further comprising showing messages sent to, drafted for or received from contacts of a phonebook that have a restricting privacy attribute only after the user has entered a search criterion that at least partially matches a name of the phonebook entry concerned or on attribute associated with the phonebook entry concerned.

24. A software program product stored on a non-transitory memory executing the method according to claim 13 when run on a processor.

25. A software product stored in a non-transitory memory comprising:
   software code for associating a privacy attribute to phonebook entries or sent or received messages or calls, pictures, videos, sound recording, songs or documents associated with the phonebook entries as data that is generated or received during use of a terminal,
   software code for disclosing any of the phonebook entries or sent or received messages or calls, pictures, videos, sound recording, songs or documents associated with the phonebook entries having an enabling privacy attribute associated therewith,
   software code for searching phonebook entries on the basis of a search criterion entered by a user, and
   software code for disclosing phonebook entries or sent or received messages or calls, pictures, videos, sound recording, songs or documents associated with the phonebook entries that have a restricting privacy attribute only after a user has entered a search criterion that at least partially matches information in the phonebook entry concerned or at least partially matches an attribute associated with the phonebook entry concerned wherein the search criterion includes a predetermined number and order of characters of the phonebook entry concerned where the predetermined number and order of characters corresponds to a predefined security level.

* * * * *